United States Patent
McDermott et al.

(10) Patent No.: US 11,916,208 B2
(45) Date of Patent: Feb. 27, 2024

(54) ELECTRIFIED VEHICLE WITH CABIN PRE-COOLING STRATEGY FOR MANAGING BATTERY AND CABIN COOLING LOADS

(71) Applicant: Ford Global Technologies, LLC, Dearborn, MI (US)

(72) Inventors: Luke McDermott, Westerly, RI (US); Westin Pusey, Brownstown, MI (US); William Stewart Johnston, South Lyon, MI (US); Manfred Koberstein, Troy, MI (US); Lynn Collins, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 17/213,370

(22) Filed: Mar. 26, 2021

(65) Prior Publication Data

US 2022/0311071 A1  Sep. 29, 2022

(51) Int. Cl.
*H01M 10/63* (2014.01)
*H01M 10/48* (2006.01)
*H01M 10/625* (2014.01)
*H01M 10/613* (2014.01)

(52) U.S. Cl.
CPC ......... *H01M 10/63* (2015.04); *H01M 10/486* (2013.01); *H01M 10/613* (2015.04); *H01M 10/625* (2015.04)

(58) Field of Classification Search
CPC .. H01M 10/63; H01M 10/613; H01M 10/625; H01M 10/486
See application file for complete search history.

(56) References Cited

U.S. PATENT DOCUMENTS

| | | | |
|---|---|---|---|
| 8,620,506 B2 | 12/2013 | Kummer et al. | |
| 9,002,568 B2 | 4/2015 | Datta et al. | |
| 9,446,682 B2 | 9/2016 | Gauthier et al. | |
| 9,446,772 B2 | 9/2016 | Lovett et al. | |
| 2010/0206957 A1* | 8/2010 | Vyas | B60H 1/00428 165/61 |
| 2011/0153140 A1* | 6/2011 | Datta | B60R 16/037 701/1 |
| 2014/0157803 A1* | 6/2014 | Pebley | B60H 1/00778 62/89 |
| 2016/0207416 A1* | 7/2016 | Gauthier | G07C 5/085 |

FOREIGN PATENT DOCUMENTS

CN  101551175  * 10/2009

* cited by examiner

*Primary Examiner* — Alexander Usyatinsky
(74) *Attorney, Agent, or Firm* — David B. Kelley; Carlson, Gaskey & Olds, P.C.

(57) ABSTRACT

This disclosure relates to an electrified vehicle having a cabin pre-cooling strategy for managing battery and cabin cooling loads. A corresponding method is also disclosed. An example electrified vehicle includes a battery for propulsion, a cabin, a thermal management system configured to thermally condition both the battery and the cabin, and a controller configured to follow a cabin pre-cooling strategy to pre-cool the cabin when an expected cooling load of the battery, if the electrified vehicle were to be driven in present conditions, exceeds an upper battery cooling load threshold.

20 Claims, 4 Drawing Sheets

ELECTRIFIED VEHICLE WITH CABIN PRE-COOLING STRATEGY FOR MANAGING BATTERY AND CABIN COOLING LOADS

TECHNICAL FIELD

This disclosure relates to an electrified vehicle having a cabin pre-cooling strategy for managing battery and cabin cooling loads. A corresponding method is also disclosed.

BACKGROUND

The need to reduce fuel consumption and emissions in vehicles is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines of an electrified vehicle. The battery pack may include one or more groupings of interconnected battery cells. The battery cells generate heat during certain conditions, such as charging and discharging operations. Battery thermal management systems are employed to manage the heat generated by the battery cells of the battery pack. In some electrified vehicles, the heating ventilation and air conditioning (HVAC) system includes a circuit for thermally conditioning a passenger cabin and another circuit for thermally conditioning the battery pack. The circuits, or loops, that thermally condition the passenger cabin and the battery pack may share a number of common components, such as a common compressor and condenser unit.

SUMMARY

An electrified vehicle according to an exemplary aspect of the present disclosure includes, among other things, a battery. The electrified vehicle uses energy stored in the battery for propulsion. The electrified vehicle further includes a cabin, a thermal management system configured to thermally condition both the battery and the cabin, and a controller configured to follow a cabin pre-cooling strategy to pre-cool the cabin when an expected cooling load of the battery, if the electrified vehicle were to be driven in present conditions, exceeds an upper battery cooling load threshold.

In a further non-limiting embodiment of the foregoing electrified vehicle, the expected cooling load of the battery is determined based on a temperature of the battery.

In a further non-limiting embodiment of any of the foregoing electrified vehicles, the controller only follows the cabin pre-cooling strategy when the electrified vehicle is parked.

In a further non-limiting embodiment of any of the foregoing electrified vehicles, the controller only follows the cabin pre-cooling strategy when a temperature of the cabin exceeds an upper cabin temperature threshold.

In a further non-limiting embodiment of any of the foregoing electrified vehicles, once the controller has begun following the cabin pre-cooling strategy, the controller stops following the cabin pre-cooling strategy once the temperature of the cabin falls below the upper cabin temperature threshold by a predetermined amount.

In a further non-limiting embodiment of any of the foregoing electrified vehicles, when following the cabin pre-cooling strategy, the controller selectively activates one or both of a cabin blower and a cabin air conditioner based on whether the electrified vehicle is on plug and based on a user input.

In a further non-limiting embodiment of any of the foregoing electrified vehicles, when following the cabin pre-cooling strategy and when the electrified vehicle is off plug, the controller is configured to issue a first instruction to activate the cabin blower only for a first period of time.

In a further non-limiting embodiment of any of the foregoing electrified vehicles, if the temperature of the cabin has not fallen below the upper cabin temperature threshold by a predetermined amount after the first period of time, the controller is configured to issue a second instruction to activate the cabin air conditioner if permitted by the user input.

In a further non-limiting embodiment of any of the foregoing electrified vehicles, when following the cabin pre-cooling strategy and when the electrified vehicle is on plug, the controller is configured to issuing an instruction to activate both the cabin blower and the cabin air conditioner.

In a further non-limiting embodiment of any of the foregoing electrified vehicles, once the controller has begun following the cabin pre-cooling strategy, the controller stops following the cabin pre-cooling strategy after a predetermined amount of time.

In a further non-limiting embodiment of any of the foregoing electrified vehicles, when the electrified vehicle has been parked for a period of time longer than an upper time threshold, the controller does not follow the cabin pre-cooling strategy.

In a further non-limiting embodiment of any of the foregoing electrified vehicles, when the temperature of the cabin is below the upper cabin temperature threshold, the controller does not follow the cabin pre-cooling strategy.

In a further non-limiting embodiment of any of the foregoing electrified vehicles, when a range of the electrified vehicle is less than a lower range threshold, the controller does not follow the cabin pre-cooling strategy.

In a further non-limiting embodiment of any of the foregoing electrified vehicles, when a temperature of the battery is below an upper battery temperature threshold, the controller does not follow the cabin pre-cooling strategy.

A method according to an exemplary aspect of the present disclosure includes, among other things, pre-cooling a cabin of an electrified vehicle by following a cabin pre-cooling strategy when an expected cooling load of a battery of the electrified vehicle, if the electrified vehicle were to be driven in present conditions, exceeds an upper battery cooling load threshold.

In a further non-limiting embodiment of the foregoing method, the expected cooling load of the battery is determined based on a temperature of the battery.

In a further non-limiting embodiment of any of the foregoing methods, the pre-cooling step is only performed when the electrified vehicle is parked and when a temperature of the cabin exceeds an upper cabin temperature threshold.

In a further non-limiting embodiment of any of the foregoing methods, if the electrified vehicle is off plug, the cabin pre-cooling strategy includes: activating a cabin blower only for a first period of time, and if the temperature of the cabin has not fallen below the upper cabin temperature threshold by a predetermined amount after the first period of time, activating the cabin air conditioner if permitted by a user input.

In a further non-limiting embodiment of any of the foregoing methods, if the electrified vehicle is on plug, the pre-cooling strategy includes activating both a cabin blower and a cabin air conditioner.

In a further non-limiting embodiment of any of the foregoing methods, the method includes stopping the pre-cooling strategy after a predetermined amount of time or once the temperature of the cabin falls below the upper cabin temperature threshold by a predetermined amount.

BRIEF DESCRIPTION OF THE DRAWINGS

In FIG. 2, some components of the electrified vehicle, such as a thermal management system, are shown schematically.

DETAILED DESCRIPTION

This disclosure relates to an electrified vehicle having a cabin pre-cooling strategy for managing battery and cabin cooling loads. A corresponding method is also disclosed. An example electrified vehicle includes a battery for propulsion, a cabin, a thermal management system configured to thermally condition both the battery and the cabin, and a controller configured to follow a cabin pre-cooling strategy to pre-cool the cabin when an expected cooling load of the battery, if the electrified vehicle were to be driven in present conditions, exceeds an upper battery cooling load threshold. This disclosure has a number of other benefits which will be appreciated from the following description. Among them, this disclosure achieves effective cabin cooling in conditions in which a battery cooling load may have otherwise prevented effective cabin cooling, leading to improved passenger comfort, all while managing the state of charge of the battery.

Figure 1:
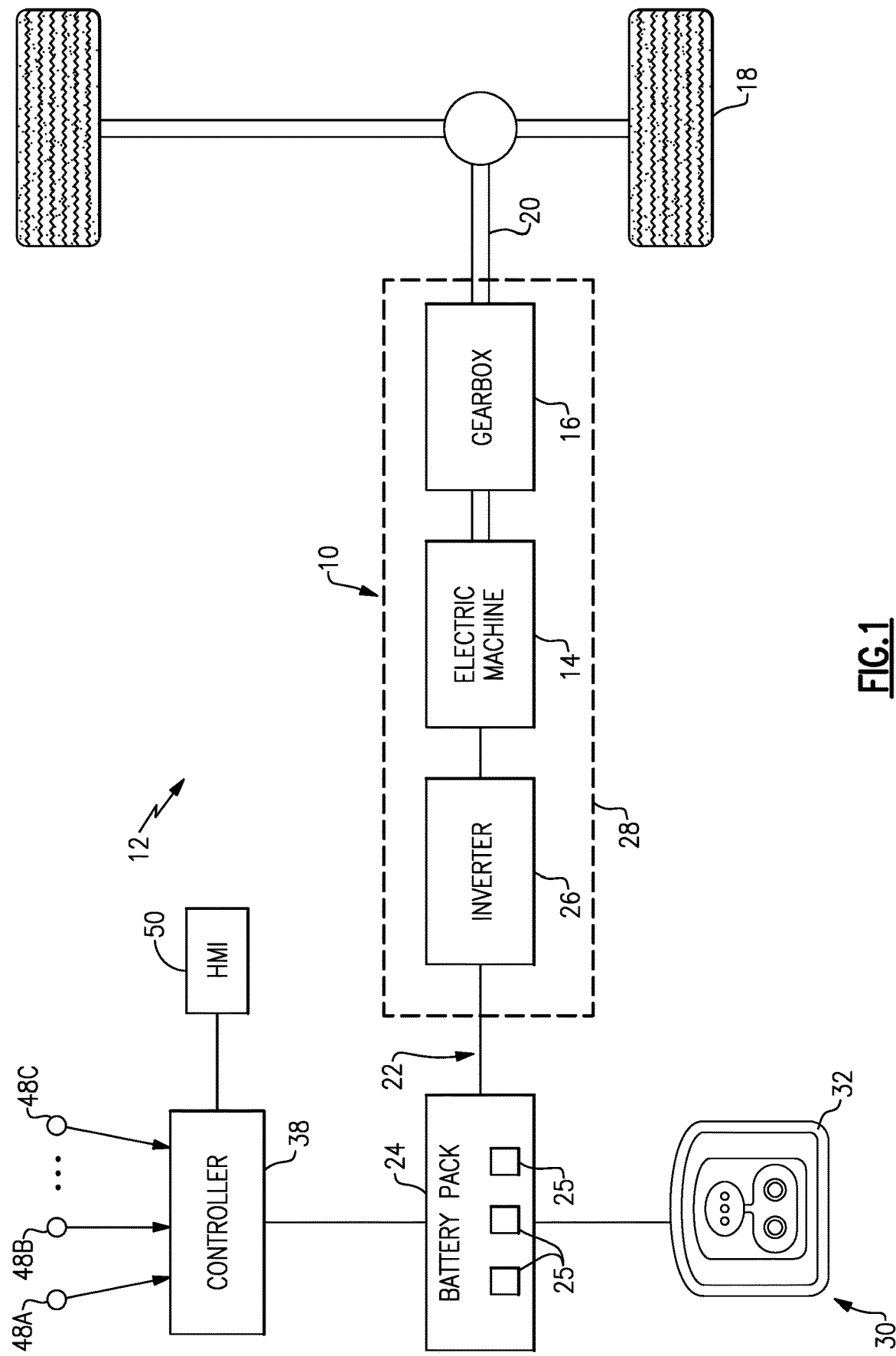
FIG. 1 schematically illustrates an example powertrain of an electrified vehicle.

FIG. 1 schematically illustrates a powertrain 10 of an electrified vehicle 12, which in this example is a battery electric vehicle (BEV). In the example, the electrified vehicle 12 is propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, gearbox 16, and the inverter 26 may collectively be referred to as a transmission 28.

The battery pack 24 is an energy storage device and, in this example, is an exemplary electrified vehicle battery. The battery pack 24 may be referred to simply as a "battery." The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 also includes a charging system 30 for periodically charging the cells of the battery pack 24. The charging system 30 may be connected to an external power source, such as an electrical grid 34 (FIG. 2), for receiving and distributing power to the cells.

In one non-limiting embodiment, the charging system 30 includes an interface, which in this example is a charging port 32 located on-board the electrified vehicle 12. The charging port 32 is adapted to selectively receive power from an external power source, such as from a power cable connected to the external power source, and then distribute the power to the battery pack 24 for charging the cells. One example external power source is an electrified vehicle charging station 36 (FIG. 2), such as a publicly available electrified vehicle charging station. In another example, the electrified vehicle charging station is private, such as those at homes or businesses. The charging port 32 may be configured to couple to a plug supplying alternating current (AC) power or a plug supplying direct current (DC) power. In this regard, the charging system 30 may be equipped with power electronics used to convert AC power received from an external power supply to DC power for charging the cells of the battery pack 24. The charging system 30 may also include a DC-to-DC converter in some examples. The charging system 30 may also accommodate one or more conventional voltage sources from the external power supply (e.g., 110 volt, 220 volt, etc.).

The electrified vehicle 12 further includes a controller 38, which may be programmed with executable instructions for interfacing with and operating the various components of the electrified vehicle 12. The controller 38 is configured to receive information from the electrified vehicle 12 and is configured to interpret that information and issue commands to various components of the electrified vehicle 12 based on that information. The controller 38 is shown schematically in FIGS. 1 and 2. It should be understood that the controller 38 may include hardware and software, and could be part of an overall vehicle control module, such as a body control module (BCM) or vehicle system controller (VSC), or could alternatively be a stand-alone controller separate from the BCM or VSC. Further, the controller 38 may be programmed with executable instructions for interfacing with and operating the various components of the electrified vehicle 12. The controller 38 additionally includes a processing unit and non-transitory memory for executing the various control strategies and modes of the vehicle system.

Figure 2:
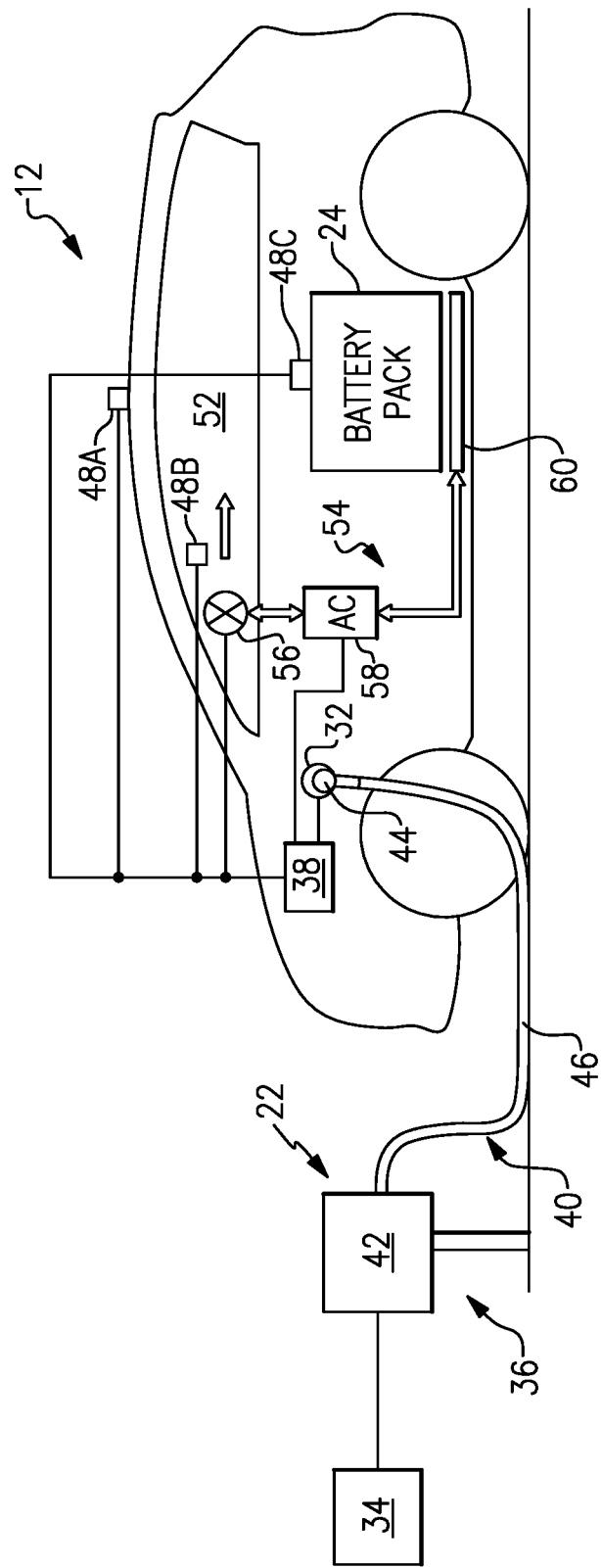
FIG. 2 schematically illustrates an example electrified vehicle adjacent an electrified vehicle charging station.

FIG. 2 schematically illustrates an electrified vehicle 12, which in this example is a plug-in BEV, relative to an electrified vehicle charging station 36 ("charging station 36"). The charging station 36 is configured to either directly or indirectly charge the battery pack 24. The charging station 36 includes a tether-type charger assembly 40 and is coupled to an electrical grid 34, which is a grid power source. The charger assembly 40 conveys power from the electrical grid 34 to the electrified vehicle 12. In this example, the charger assembly 40 includes a terminal 42, a plug 44, and a charger cable 46 between the terminal 42 and the plug 44. The plug 44 may have a standard plug configuration corresponding to that of the charging port 32. While an example charging station 36 is shown, this disclosure extends to other types of vehicle-to-grid interfaces.

Charging the electrified vehicle 12 using the charging station 36 involves positioning the electrified vehicle 12 near the charging station 36 and electrically coupling the plug 44 to the electrified vehicle 12 via charging port 32, and in particular by inserting the plug 44 into the charging port 32. When the plug 44 is inserted into the charging port 32 in this manner, the electrified vehicle 12 is considered "on plug." When on plug, power can then move from the electrical grid 34 to the electrified vehicle 12, and specifically to the battery pack 24. When the plug 44 not inserted into the charging port 32, power cannot move between the electrical grid 34 and the electrified vehicle 12, and the electrified vehicle 12 is considered "off plug."

In this disclosure, the controller 38 is responsive to a number of inputs. Some of the inputs are from sensors 48A-48C (FIG. 1), while other inputs are user inputs, which may be provided via a human-machine interface ("HMI") 50 (FIG. 1). The HMI 50 may be a display, such as a touch screen display, inside the electrified vehicle 12. The HMI 50 may alternatively or additionally be a mobile device, such as a mobile phone, of the user. Further, the HMI may alternatively or additionally be a cloud-based user interface, such as a web-based application. Further, while three sensors 48A-48C are shown, the controller 38 could communicate with additional or fewer sensors in other examples. In general, this disclosure extends to configurations where the controller 38 receives one or more inputs.

With further reference to FIG. 2, the sensor 48A, in this example, is an ambient condition sensor. In a particular example, the sensor 48A is configured to generate a signal that can be interpreted by the controller 38 as an ambient temperature. The ambient temperature is the temperature of the environment immediately surrounding the electrified vehicle 12.

The sensor 48B, in this example, is a cabin temperature sensor and is configured to generate a signal indicative of a temperature of the passenger cabin 52 of the electrified vehicle 12. The passenger cabin 52 of the electrified vehicle 12 is a space where passengers can sit when inside the electrified vehicle 12. The passenger cabin 52 may also include a cargo area especially when the electrified vehicle 12 is a sport utility vehicle (SUV). In this regard, while shown as a sedan in FIG. 2, this disclosure extends to other types of vehicles, such as vans, trucks, SUVs, etc.

The sensor 48C is a battery temperature sensor configured to generate a signal indicative of a temperature of the battery pack 24. The sensors 48A-48C may each be provided by a single sensor. Alternatively, the sensors 48A-48C may each include multiple sensors or arrays of sensors arranged at various locations. For example, the sensor 48C may include multiple sensors at various locations on the battery pack 24. In that example, the temperature of the battery pack 24 may be determined by the controller 38 using an average of the reported temperatures, or by using some other technique.

FIG. 2 also schematically illustrates some aspects of a thermal management system 54 that can be incorporated into the electrified vehicle 12. The thermal management system 54 may be used to manage the thermal load generated by various vehicle components. Here, the thermal management system 54 manages the thermal loads of the battery pack 24 and the passenger cabin 52. In particular, the thermal management system 54 includes individual loops, or circuits, configured to manage the thermal loads of the battery pack 24 and the passenger cabin 52. Thermal loads, such as cooling loads, of the battery pack 24 and the passenger cabin 52 refer to the cooling requirements of the battery pack 24 and the passenger cabin 52 and in particular to the amount of energy needed to remove heat from the battery pack 24 and the passenger cabin 52 to reach a particular temperature. Thermal loads are determined using known techniques using one or more factors, some of which are mentioned herein.

In one embodiment, the thermal management system 54 includes a cabin blower 56 and a cabin air conditioner 58, which includes an evaporator. The cabin blower 46 and the cabin air conditioner 58 can be controlled individually to thermally condition the passenger cabin 52 of the electrified vehicle 12. The thermal management system 54 further includes a thermal exchange plate 60 configured to thermally condition the battery pack 24. Specifically, the battery pack 24, and in particular the battery cells 25, may be mounted upon the thermal exchange plate 60.

Although shown schematically, one would understand that the thermal management system 54 includes various conduits or passages such as tubes, hoses, pipes, etc. The battery thermal management system 54, in this example, circulates a coolant, such as glycol or any other coolant, to thermally manage the battery pack 24 and the passenger cabin 52. Further, the thermal management system 54 includes components of known heating ventilation and air conditioning (HVAC) systems, such as compressors, condensers, evaporators, and various valves, among other possible components.

In this example, the thermal management system 54 is a dual loop system, with one loop for thermally conditioning the passenger cabin 52 and another loop for thermally conditioning the battery pack 24. The two loops share a number of common components, in this example. In particular, the two loops share a common compressor and condenser unit. Further, refrigerant is shared between the two loops. In addition to the cabin blower 56 and the cabin air conditioner 58, the loop corresponding to the passenger cabin 52 may include a separate thermostatic expansion valve (TXV). The loop corresponding to the battery pack 24 may include a separate coolant pump. Such a dual loop thermal management system 54 avoids duplication of some components, which reduces cost, weight, and space. This disclosure balances the cooling loads of both the battery pack 24 and the passenger cabin 52 by providing a cabin pre-cooling strategy in certain conditions.

Figure 3A:
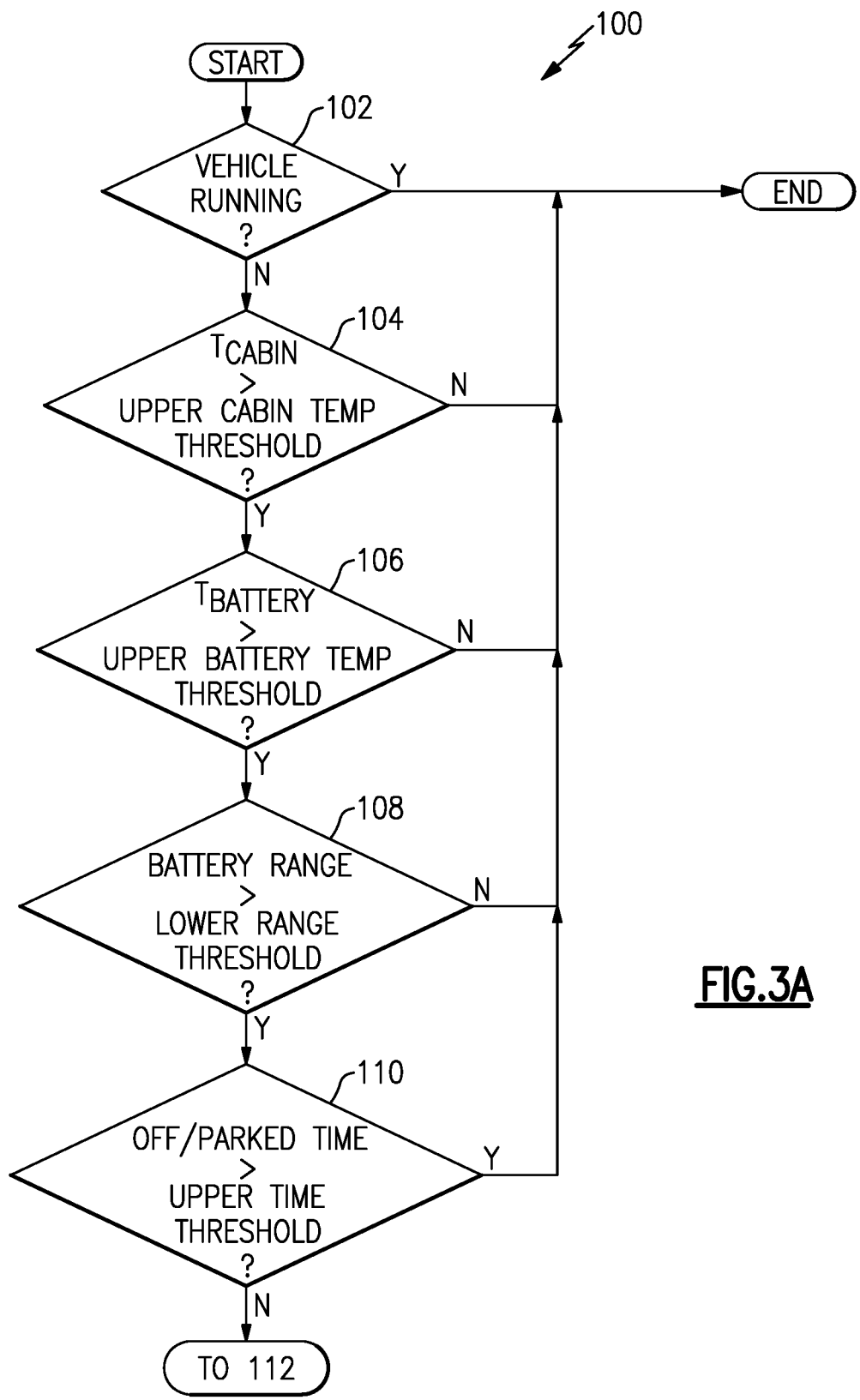
FIG. 3A is a flow chart representative of a first portion of an example method of this disclosure.
Figure 3B:
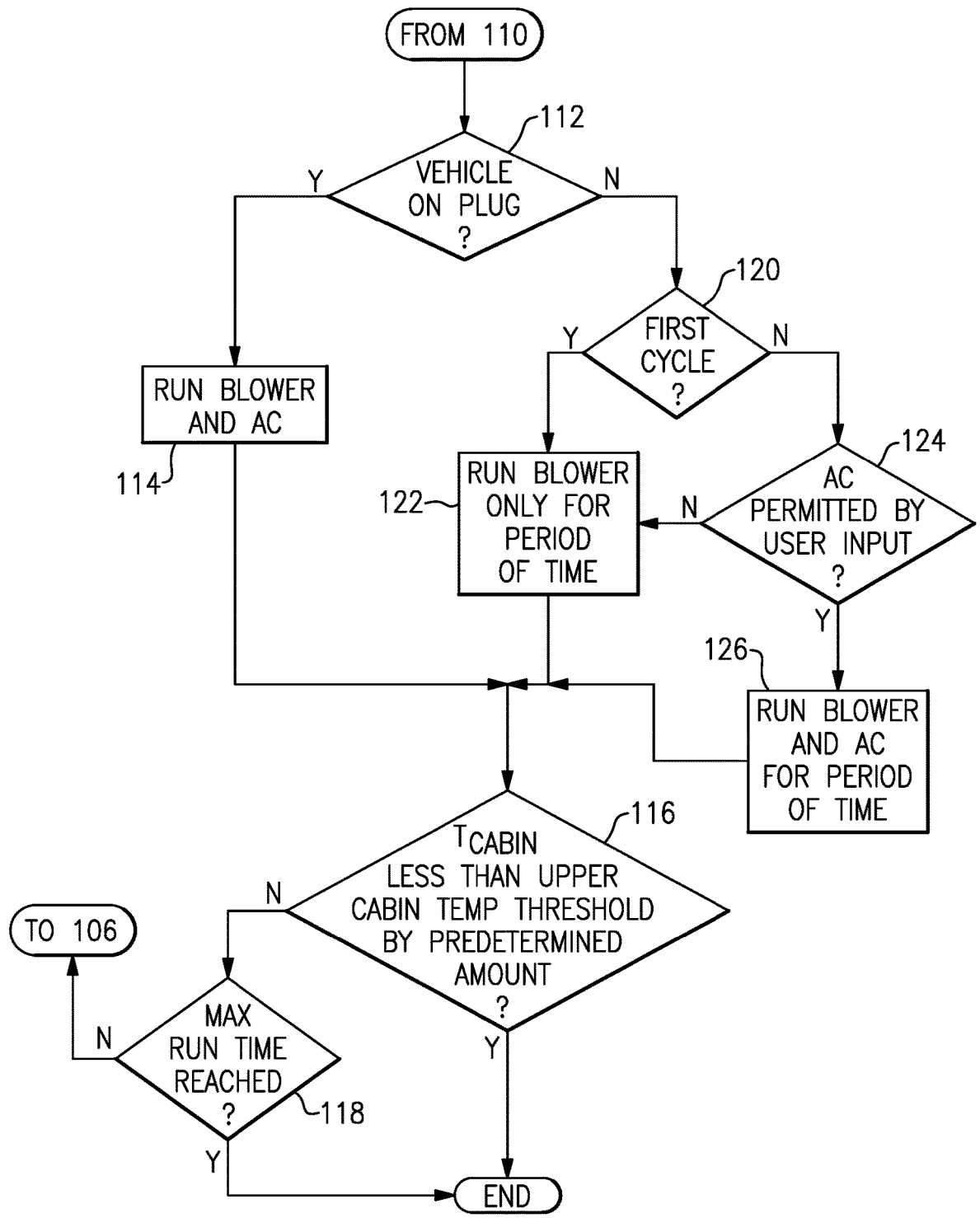
FIG. 3B is a flow chart representative of a second portion of the example method.

Together, FIGS. 3A and 3B illustrate a flow chart representative of an example method 100. The method 100 includes an example set of conditions in which the electrified vehicle 12 will follow the cabin pre-cooling strategy. The method 100 further includes an example cabin pre-cooling strategy. The method 100 is carried out by various components of the thermal management system 54 in response to instructions from the controller 38. As would be understood, any reference to the controller 38 performing an action is a reference to the controller 38 providing an instruction to a component, which then performs that action in response to the instruction from the controller 38.

In general, when an expected cooling load of the battery pack 24 exceeds an upper battery cooling load threshold, the controller 38 may follow the cabin pre-cooling strategy. In an example, the upper battery cooling load threshold is a predefined value above which the thermal management system 54 may not be able to meet the cooling loads of both the battery pack 24 and the passenger cabin 52. In such situations, the thermal management system 54 may prioritize cooling of the battery pack 24, which may lead to passenger discomfort. The method 100 is particularly useful in these situations. Specifically, the method 100 seeks to avoid such situations by pre-cooling the passenger cabin 52 according to a cabin pre-cooling strategy.

In an example of this disclosure, the cabin pre-cooling strategy is only necessary when the electrified vehicle 12 is parked and not running. There are typically minimal to no cooling loads associated with either the battery pack 24 or the passenger cabin 52 at these times as the electrified vehicle 12 is not being driven and there are no passengers in the passenger cabin 52. In the method 100, the controller 38 considers conditions related to the expected cooling load of the battery pack 24, and determines an expected cooling load of the battery pack 24 at present conditions, if the electrified vehicle 12 were to be driven in present conditions. In this disclosure, present conditions refers to current, real-time conditions. In this way, the electrified vehicle 12 is prepared to handle the cooling loads of the battery pack 24 and the passenger cabin 52 if and when the electrified vehicle 12 is driven.

The controller 38 compares the expected battery cooling load at present conditions to the upper battery cooling load threshold which, if exceeded, is indicative of a situation in which the thermal management system 54 may not be able to meet the cooling loads of both the battery pack 24 and the passenger cabin 52.

In this disclosure, by following the cabin pre-cooling strategy, the controller 38 is able to prepare the electrified vehicle 12 for high battery cooling loads by pre-cooling the passenger cabin 52, which reduces the cooling load of the passenger cabin 52, and which in turn frees the thermal management system 54 to meet the load of the battery pack 24 without compromising passenger comfort. The controller 38 does so efficiently and without needlessly draining the state of charge of the battery pack 24.

The method 100 will now be described in more detail with reference to FIGS. 3A and 3B. Beginning at block 102, the controller 38 considers whether the electrified vehicle 12 is running. If the electrified vehicle 12 is running, such as being driven, the answer at block 102 is "yes" and the cabin pre-cooling strategy is not followed. If the electrified vehicle 12 is parked but still running, the answer at block 102 is also "yes." However, if the electrified vehicle 12 is parked and not running, such as when the electrified vehicle 12 is off, the answer to block 102 is "no" and controller 38 continues to a series of questions between blocks 104, 106, 108, and 110 to determine whether the pre-cooling strategy should be followed.

In this example, the controller 38 first considers, at 104, whether the temperature of the passenger cabin 52 is above an upper cabin temperature threshold. The temperature of the passenger cabin 52 is determined based on the signal from sensor 48B, in this example. The upper cabin temperature threshold is 45° C. (110° F.) in one example. The upper cabin temperature threshold is a temperature above which the thermal management system 54 may not be able to efficiently cool the passenger cabin 52, depending on other conditions, such as the cooling load of the battery pack 24, ambient temperature, etc. If the answer at block 104 is "no," then the cabin pre-cooling strategy is not followed. If the answer is "yes," it may be necessary to pre-cool the passenger cabin 52, and the controller 38 continues to block 106.

At 106, the controller 38 considers whether the temperature of the battery pack 24, as indicated by the signal from sensor 48C, is above an upper battery temperature threshold. The temperature of the battery pack 24 is the current, real-time temperature of the battery pack 24. The current temperature of the battery pack 24 is proportional to and directly relates to the expected cooling load of the battery pack 24, if the electrified vehicle 12 were to be driven at that time. The upper battery temperature threshold is a temperature above which the thermal management system 54 may be required to prioritize cooling of the battery pack 24 and may not be able to efficiently cool the passenger cabin 52, depending on other conditions, such as the temperature of the passenger cabin 52 and ambient temperature, etc. If the temperature of the battery pack 24 is not above the upper battery temperature threshold, meaning the answer is "no" at block 106, then the cabin pre-cooling strategy is not followed. If the answer is "yes," then the controller 38 continues to block 108.

Other factors besides battery temperature may also contribute to the expected cooling load of the battery pack 24. In this regard, as an alternative to step 106, step 106 could be replaced with an algorithm or calculation that estimates battery cooling load based on ambient conditions and the temperature of the battery pack 24 and compares that estimate with an upper threshold battery cooling load.

At 108, the controller 38 considers whether the range of the battery pack 24 is below a lower range threshold. In order to preserve the range of the battery pack 24, the cabin pre-cooling strategy is not followed if the range of the battery pack 24 is below the lower range threshold. For example, the lower range threshold may be 20 miles. In that example, if the range of the battery pack 24 is below 20 miles, the answer at block 106 is "no." Otherwise, the controller 38 continues to block 110.

At 110, the controller 38 considers whether the electrified vehicle 12 has been parked and/or off for a period of time greater than an upper time threshold. The upper time threshold is 72 hours, in one example. If the answer to block 110 is "yes," the electrified vehicle 12 has likely been parked for a relatively long period of time, and, in these situations, it is relatively unlikely that the electrified vehicle 12 will be driven. As such, the controller 38 determines, at 110, that the cabin pre-cooling strategy should not be followed.

If the answers to blocks 104, 106, and 108 are "yes" and the answer to block 110 is "no," the controller 38 follows the cabin pre-cooling strategy. Thus, the controller 38 continues to block 112, where the controller 38 will selectively activate one or both of a cabin blower 56 and a cabin air conditioner 58 based on whether the electrified vehicle 12 is on plug or off plug, and further based on a user input indicating a user preference.

At 112, the controller 38 considers whether the electrified vehicle 12 is on plug. If the electrified vehicle 12 is on plug, then the power used to pre-cool the passenger cabin 52 will be supplied from the grid 34. As such, at 114, the controller 38 runs both the cabin blower 56 and cabin air conditioner 58 until the temperature of the passenger cabin 52 is less than the upper cabin temperature threshold by a predetermined amount, as determined in block 116, or until a maximum cabin pre-cooling strategy run time is reached, as determined in block 118.

The controller 38 may follow block 114 for a predetermined period of time, such as 5 minutes, before checking other variables, such as those in blocks 116, 118, 106, 108, and 110, to determine whether it is still necessary to continue pre-cooling the passenger cabin 52. If, for instance, conditions have changed such that the temperature of the battery pack 24 is less than the upper battery temperature threshold, the controller 38 will cease following the cabin pre-cooling strategy despite the temperature of the passenger cabin 52 potentially being above the upper cabin temperature threshold.

With respect to block 116, the predetermined amount is a predefined temperature amount, such as 10° C. (18° F.). The predetermined amount serves as a hysteresis, or delay, in the cabin pre-cooling strategy, and prevents the cabin pre-cooling strategy from being rapidly activated and de-activated in quick succession when the temperature of the passenger cabin 52 is near the upper cabin temperature threshold.

With respect to block 118, the maximum run time is a period of time which, when reached, the controller 38 will cease following the cabin pre-cooling strategy. In an example, the maximum run time is 12 hours. The maximum run time is calculated starting at a time when the controller 38 first follows the cabin pre-cooling strategy. The maximum run time is reset each time the electrified vehicle 12 is turned on and/or driven.

If the electrified vehicle 12 is off plug, as determined at 112, then the controller 38 follows a different set of steps in order to preserve the charge of the battery pack 24. At 120, if this is the first instance the controller 38 has reached block 120 after beginning to follow the cabin pre-cooling strategy (i.e., the first cycle), the controller 38 will activate only the cabin blower 56 for a predetermined period of time, such as 5 minutes, at 122. Activating only the cabin blower 56 and not the cabin air conditioner 58 will preserve the charge of the battery pack 24. Activating only the cabin blower 56 may be effective in pre-cooling the passenger cabin 52 in conditions when the ambient temperature is relatively low. After the predetermined period of time, the controller 38 moves to block 116 and determines if running the cabin blower 56 only for the predetermined period of time was effective in pre-cooling the passenger cabin 52. If the answer is "yes," the cabin pre-cooling strategy is no longer followed. If the answer is "no," the controller 38 flows to block 118, and may flow all the way back to block 120, depending on the answers to blocks 118, 106, 110, and 112.

If the controller reaches block 120 for a second instance after following the cabin pre-cooling strategy, and for each additional instance, the answer will be "no" to block 120 and the controller 38 will continue to block 124. At 124, the controller 38 considers whether a user input permits the cabin air conditioner 58 to be run when following the cabin pre-cooling strategy. A user may provide this input via the HMI 50. The user input is based on the preference of the user for a pre-cooled passenger cabin 52 versus the preference of the user for preserving the charge of the battery pack 24.

If the user input permits the cabin air conditioner 58 to be run when the electrified vehicle 12 is off plug, then the controller 38 activates both the cabin blower 56 and the cabin air conditioner 58 for a predetermined period of time, such as 5 minutes, at 126. If not, then the controller 38 follows block 122, and activates only the cabin blower 56. Alternatively, at 126, the controller 38 may also consider both the predetermined period of time and the temperature of the passenger cabin 52, and if the temperature of the passenger cabin 52 is less than the upper cabin temperature threshold by a predetermined amount, the controller 38 may deactivate the cabin blower 56 and the cabin air conditioner 58 before the predetermined period of time lapses.

The method 100 is exemplary and may be modified to consider additional or fewer conditions and/or factors. The method 100 may also follow additional or fewer steps to pre-cool the passenger cabin 52. Further, while pre-cooling is contemplated herein, the method 100 may be modified to pre-heat the passenger cabin 52 to avoid situations in which a battery heating load may prevent adequate heating of the passenger cabin 52.

It should be understood that the aforementioned pre-cooling strategy may be deactivated by a user.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery, wherein the electrified vehicle uses energy stored in the battery for propulsion;
   a cabin;
   a thermal management system configured to thermally condition both the battery and the cabin; and
   a controller programmed to follow a cabin pre-cooling strategy to pre-cool the cabin when an expected cooling load of the battery, if the electrified vehicle were to be driven in present conditions, exceeds an upper battery cooling load threshold.

2. The electrified vehicle as recited in claim 1, wherein the expected cooling load of the battery is determined based on a temperature of the battery.

3. The electrified vehicle as recited in claim 1, wherein the controller only follows the cabin pre-cooling strategy when the electrified vehicle is parked.

4. The electrified vehicle as recited in claim 1, wherein the controller only follows the cabin pre-cooling strategy when a temperature of the cabin exceeds an upper cabin temperature threshold.

5. The electrified vehicle as recited in claim 4, wherein, once the controller has begun following the cabin pre-cooling strategy, the controller stops following the cabin pre-cooling strategy once the temperature of the cabin falls below the upper cabin temperature threshold by a predetermined amount.

6. The electrified vehicle as recited in claim 4, wherein, when following the cabin pre-cooling strategy, the controller selectively activates one or both of a cabin blower and a cabin air conditioner based on whether the electrified vehicle is on plug and based on a user input.

7. The electrified vehicle as recited in claim 6, wherein, when following the cabin pre-cooling strategy and when the electrified vehicle is off plug, the controller is programmed to issue a first instruction to activate the cabin blower only for a first period of time.

8. The electrified vehicle as recited in claim 7, wherein, if the temperature of the cabin has not fallen below the upper cabin temperature threshold by a predetermined amount after the first period of time, the controller is programmed to issue a second instruction to activate the cabin air conditioner if permitted by the user input.

9. The electrified vehicle as recited in claim 6, wherein, when following the cabin pre-cooling strategy and when the electrified vehicle is on plug, the controller is programmed to issue an instruction to activate both the cabin blower and the cabin air conditioner.

10. The electrified vehicle as recited in claim 1, wherein, once the controller has begun following the cabin pre-cooling strategy, the controller stops following the cabin pre-cooling strategy after a predetermined amount of time.

11. The electrified vehicle as recited in claim 1, wherein, when the electrified vehicle has been parked for a period of time longer than an upper time threshold, the controller does not follow the cabin pre-cooling strategy.

12. The electrified vehicle as recited in claim 1, wherein, when the temperature of the cabin is below the upper cabin temperature threshold, the controller does not follow the cabin pre-cooling strategy.

13. The electrified vehicle as recited in claim 1, wherein, when a present range of the battery of the electrified vehicle is less than a lower range threshold, the controller does not follow the cabin pre-cooling strategy.

14. The electrified vehicle as recited in claim 1, wherein, when a temperature of the battery is below an upper battery temperature threshold, the controller does not follow the cabin pre-cooling strategy.

15. A method, comprising:
pre-cooling a cabin of an electrified vehicle by following a cabin pre-cooling strategy when an expected cooling load of a battery of the electrified vehicle, if the electrified vehicle were to be driven in present conditions, exceeds an upper battery cooling load threshold.

16. The method as recited in claim 15, wherein the expected cooling load of the battery is determined based on a temperature of the battery.

17. The method as recited in claim 15, wherein the pre-cooling step is only performed when the electrified vehicle is parked and when a temperature of the cabin exceeds an upper cabin temperature threshold.

18. The method as recited in claim 15, wherein, if the electrified vehicle is off plug, the cabin pre-cooling strategy includes:
activating a cabin blower only for a first period of time, and
if the temperature of the cabin has not fallen below the upper cabin temperature threshold by a predetermined amount after the first period of time, activating the cabin air conditioner if permitted by a user input.

19. The method as recited in claim 15, wherein, if the electrified vehicle is on plug, the pre-cooling strategy includes activating both a cabin blower and a cabin air conditioner.

20. The method as recited in claim 15, further comprising stopping the pre-cooling strategy after a predetermined amount of time or once the temperature of the cabin falls below the upper cabin temperature threshold by a predetermined amount.

* * * * *